(12) United States Patent
Benner et al.

(10) Patent No.: US 9,933,308 B2
(45) Date of Patent: Apr. 3, 2018

(54) METHOD FOR DETERMINING SPECTRALLY TUNED MIXED-COLOR LED LIGHT ENGINES

(71) Applicant: GE LIGHTING SOLUTIONS, LLC, East Cleveland, OH (US)

(72) Inventors: Kevin Jeffrey Benner, Solon, OH (US); Gary Robert Allen, Chesterland, OH (US); Ashfaqul i. Chowdhury, Broadview Heights, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 776 days.

(21) Appl. No.: 14/229,379

(22) Filed: Mar. 28, 2014

(65) Prior Publication Data

US 2015/0276546 A1 Oct. 1, 2015

(51) Int. Cl.
*G01J 3/50* (2006.01)
*G01M 11/00* (2006.01)
*G09G 3/00* (2006.01)
*G09G 3/32* (2016.01)
*G09G 5/02* (2006.01)

(52) U.S. Cl.
CPC ............ *G01J 3/505* (2013.01); *G09G 3/006* (2013.01); *G09G 3/32* (2013.01); *G09G 5/026* (2013.01); *G09G 2320/0666* (2013.01)

(58) Field of Classification Search
CPC .......... H01L 2924/0002; H01L 33/504; H05B 33/0857; G01J 3/10; G01J 3/28; G01J 3/501; G01J 3/36; F21V 9/16
USPC ....... 362/84, 231, 249.02, 293; 702/32, 182, 702/189; 315/294
See application file for complete search history.

(56) References Cited

U.S. PATENT DOCUMENTS

| 8,258,722 B2 | 9/2012 | Swoboda et al. |
| 2011/0043137 A1 | 2/2011 | Negley et al. |
| 2011/0057571 A1 | 3/2011 | Ackermann et al. |

(Continued)

OTHER PUBLICATIONS

Proc. SPIE 8278, Light-Emitting Diodes: Materials, Devices, and Applications for Solid State Lighting XVI, 82781O (Feb. 9, 2012); doi:10.1117/12.909429 "Optimization of light quality from color mixing light-emitting diode systems for general lighting".

*Primary Examiner* — Roy Y Yi
*Assistant Examiner* — Jeffrey Aiello
(74) *Attorney, Agent, or Firm* — Peter T. DiMauro; GE Global Patent Operation

(57) ABSTRACT

A method of determining a modified spectral content of a light emitting diode (LED) light engine includes separating spectral data from the LED light engine into at least two spectral component bands, calculating respective efficacies for each of the at least two spectral components, simulating a first LED spectral component for a predetermined peak position and intensity, modifying spectral data from an existing LED to match a predetermined peak wavelength, applying factorial design-of-experiment techniques to the simulated first LED spectral component and the modified spectral data to obtain a selection of spectra, and selecting a spectrum from the results of the applying step, wherein the selected spectrum includes characteristics of the modified spectral content. The method includes the step of producing a LED light engine/electronic driver combination having the selected spectrum. A non-transitory medium having computer executable instructions is disclosed.

6 Claims, 4 Drawing Sheets

(56) References Cited

U.S. PATENT DOCUMENTS

| | | |
|---|---|---|
| 2011/0148327 A1 | 6/2011 | Van de Ven et al. |
| 2012/0104953 A1 | 5/2012 | Chobot |
| 2012/0328299 A1 | 12/2012 | Pickard et al. |
| 2013/0188388 A1* | 7/2013 | Jaffe ............... F21V 9/16 362/580 |
| 2013/0242595 A1* | 9/2013 | Jaffe ............. F21V 11/00 362/552 |
| 2013/0311109 A1* | 11/2013 | Yao ............. H01J 49/0036 702/23 |
| 2014/0085630 A1* | 3/2014 | Bell ............... G01J 3/28 356/301 |
| 2014/0268136 A1* | 9/2014 | Pawluczyk ........... G01J 3/027 356/326 |
| 2014/0293091 A1* | 10/2014 | Rhoads ............ G01J 3/513 348/234 |
| 2015/0276546 A1* | 10/2015 | Benner ............ G01J 3/505 702/182 |
| 2016/0223146 A1* | 8/2016 | Vick ............. H05B 33/0857 |
| 2016/0252459 A1* | 9/2016 | Bell ............. G01N 21/658 |

\* cited by examiner

METHOD FOR DETERMINING SPECTRALLY TUNED MIXED-COLOR LED LIGHT ENGINES

BACKGROUND

Light emitting diode (LED) lamps have unit-to-unit variation in light output characteristics (e.g., color consistency, color stability, lumen stability, etc.) due to material and process variations that affect the production yield. Variations between LED lamps can be due to material characteristics varying across the LED wafer, and process control variations occurring during production. Conventionally, LED lamps are sampled post-production and assigned into performance groups (i.e., 'binned') for brightness (luminous flux) and color parameters (chromaticity, temperature, rendering, stability, etc.). LED lamps within the same bin are typically packaged and sold together to maintain the appearance of a consistent product.

LEDs that emit white light can be produced either by mixing the output of red, green and blue (RGB) LEDs to form the white light, or by using a phosphor material to alter the light from a monochromatic blue, or ultraviolet (UV) LED. For example, two complementary colors can combine to form white light. However, the white light formed by these approaches can still have varying spectra, which can cause the color appearance of illuminated objects to vary.

Phosphor-based white LEDs involve coating mostly blue LEDs with different color phosphors (depending on the original LED color). These phosphor-based LEDs have efficiency losses from heat loss and other phosphor-related degradation. Some phosphor-based white LEDs encapsulate InGaN blue LEDs inside phosphor-coated epoxy. A blue-shifted yellow, yttrium aluminum garnet (BSYAG) (BSY/mint/off-state white) LED combined with a red/amber LED can provide white light at high efficiency.

BRIEF DESCRIPTION

Figure 1:
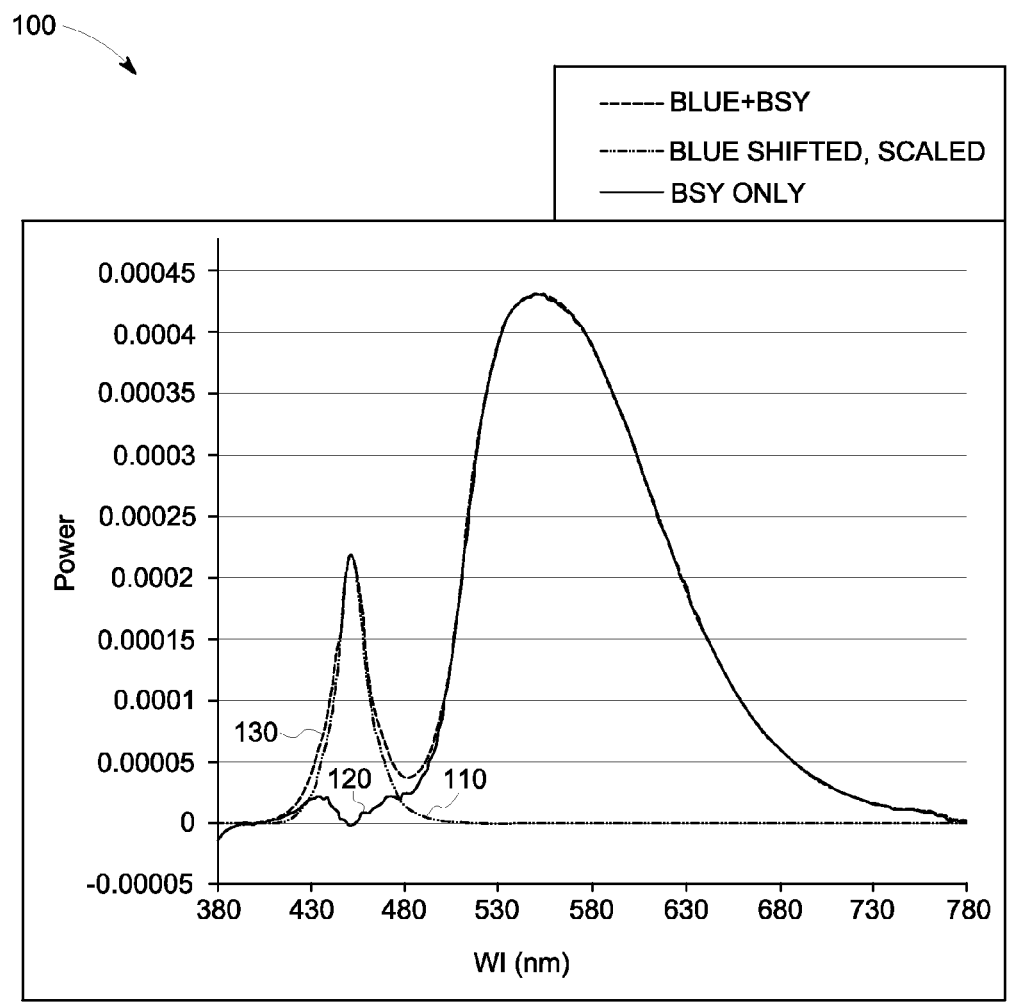
FIG. 1 depicts a plot of spectral separation and modification of blue+BSY LED in accordance with some embodiments.

Systems and methods in accordance with embodiments provide for determining a modified spectral content of a light emitting diode (LED) light engine includes separating spectral data from the LED light engine into at least two spectral component bands, calculating respective efficacies for each of the at least two spectral components, simulating a first LED spectral component for a predetermined peak position and intensity, modifying spectral data from an existing LED to match a predetermined peak wavelength, applying factorial design-of-experiment techniques to the simulated first LED spectral component and the modified spectral data to obtain a selection of spectra, and selecting a spectrum from the results of the applying step, wherein the selected spectrum includes characteristics of the modified spectral content. The method includes the step of producing a LED light engine/electronic driver combination having the selected spectrum.

DETAILED DESCRIPTION

Systems and methods in accordance with embodiments provide for determining optimal spectral content of a BSY+Red LED light engine for any arbitrarily selected color rendering index (CRI) target. For any practical implementation of a BSY+Red LED luminaire, embodiments can be used to specify the appropriate LEDs as well as fine-tune the production of a light engine/electronic driver combination for specific photometric targets.

In accordance with some embodiments, spectral data from existing BSY LEDs can be separated into Blue and BSY spectral components. The efficacies of the Blue and BSY spectral contributions to the existing BSY LED can then be calculated. The overall efficacy (radiometric efficiency and/or wall plug efficiency (WPE)) of the package can be determined from measuring the optical and electrical characteristics of the existing BSY LED using an integrating sphere, spectrometer, and standard electrical measurement devices. This overall efficacy is a function of (i) the optical power weighting of the Blue and BSY spectral components; (ii) the Stokes-shift losses of the BSY component; and (iii) the quantum efficiency (QE) of the BSY phosphor blend. Equation (I) describes the overall efficacy:

$$EB = EPKG/[(1-X)+(X \cdot SBSY \cdot QBSY)] \qquad (EQ. 1)$$

Where:
EB is the efficacy of the Blue spectral contribution;
EPKG is the WPE of the existing package;
X is ratio of the optical power of the BSY spectral component to the optical power of the combined spectrum;
SBSY is a coefficient representing the efficacy of the conversion of the blue emission by the BSY phosphor, when accounting only for energy losses attributable to Stokes shift; and
QBSY is the QE of the BSY phosphor Blend.

EPKG, and X are calculated from the measurements taken of the existing package in the integrating sphere. SBSY is calculated from the spectrum of the BSY component and the peak wavelength (Wp) of the exciting radiation (the Blue component). QBSY is assumed based on typical QEs for the type of phosphors used. EB can then be calculated. The efficacy of the BSY component is the product EB·SBSY·QBSY. EPKG varies with the LED package drive current and temperature, so data is taken over a range of combined temperatures and currents.

A new BSY LED is simulated, where the simulation is adjusted to provide a desired BSY peak position and intensity. Spectral data from existing Red LEDs is modified to match a desired peak wavelength. In accordance with one implementation, to simulate a new BSY LED, a Wp of the BSY component along with a relative optical power (X) is chosen. The simulated BSY component can then be created by either red-shifting (shifting to higher wavelengths) or blue-shifting (shifting to lower wavelengths) the BSY component spectrum measured from the existing device. A new Stokes-shift loss coefficient (SBSY) is calculated for the simulated spectrum. A drive current and temperature for the LED package is also chosen. Using the spectral and electrical data for the existing package at those drive conditions, the efficacy of the simulated package can be calculated using Equation 1 (above).

For the Red LED, measured data from an existing Red LED package, at a range of temperatures and currents, can be used. A Wp is chosen for the simulated Red LED. The simulated Red spectrum is then created by red-shifting or blue-shifting the measured Red LED spectrum. A drive current and temperature is chosen for the simulated LED. The WPE of the simulated package is either assumed to be the same as that of the measured package, or a predicted WPE can be calculated based on the Wp.

A combined spectrum comprised of the above modified LED spectra is modeled and/or created based on the variables of BSY LED current, BSY LED quantity, BSY peak wavelength, amount of blue bleed-through, Red LED current, Red LED quantity, and Red LED wavelength. In accordance with some embodiments, this combined spectrum can be the addition of the BSY LED and Red LED spectrum. Photometric quantities, such as luminous flux, chromaticity (CCx, CCy), correlated color temperature (CCT), distance to the Planckian Locus (Duv), CRI, and saturated test color R9 can then be calculated using this spectrum. The electrical power for each simulated LED can be added together to determine the total electrical power of the system. The electrical power can then be used along with the photometric quantities to calculate simulated system variables, such as luminous efficacy (LPW).

A number of combined spectra are generated using a factorial design-of-experiment (DOE) using some and/or all of the above variables. The factorial DOE provides predictions of the response of combinations of these variables to provide information regarding the effect of their interaction. From the results of the factorial DOE, an ideal spectrum is selected. In accordance with some implementations, a non-linear optimization can be carried out to maximize efficacy while holding the above LED parameter variables to given constraints (e.g., predetermined values).

Optimal light engine performance can be obtained by determining the specific BSY and Red spectral targets. This optimal performance is enhanced by fine tuning the driver circuit currents for the BSY+Red light engines.

FIG. 1 illustrates light waveform 100 of a spectral separation and modification of blue+BSY LED in accordance with some embodiments. Curve 120 depicts the wavelength (nm) of a blue shifted light, which has been scaled. The wavelength of a BSY light is depicted in curve 120. A resultant blue+BSY waveform is illustrated by curve 130. The resultant blue+BSY waveform is a result of spectral separation and modification from existing blue+BSY LEDs in accordance with embodiments.

A method in accordance with some embodiments shifts the spectrum from a blue LED ("Blue only") at a given current along the wavelength axis and adjusts in magnitude (curve 110—"BLUE SHIFTED, SCALED") to match the blue peak of a BSY LED (curve 120—"BLUE+BSY") at the same current. The spectrum "BLUE SHIFTED, SCALED" (curve 130) is subtracted from the spectrum "BLUE+BSY" to yield spectrum "BSY ONLY".

The efficacy of both the BSY and the blue portion of the spectrum are determined applying factorial DOE using variables based on the total power of each portion, the total efficacy of the combined spectrum, the calculated Stokes loss from the blue to BSY spectrum, and the known quantum efficiency of the BSY phosphor. In accordance with some implementations, the efficacy of the Blue portion, BSY portion, and combined package can be calculated using the variables listed herein, and Equation (1). These calculations can be performed numerous times, as prescribed by the factorial DOE, where each of these variables is a factor.

Figure 2:
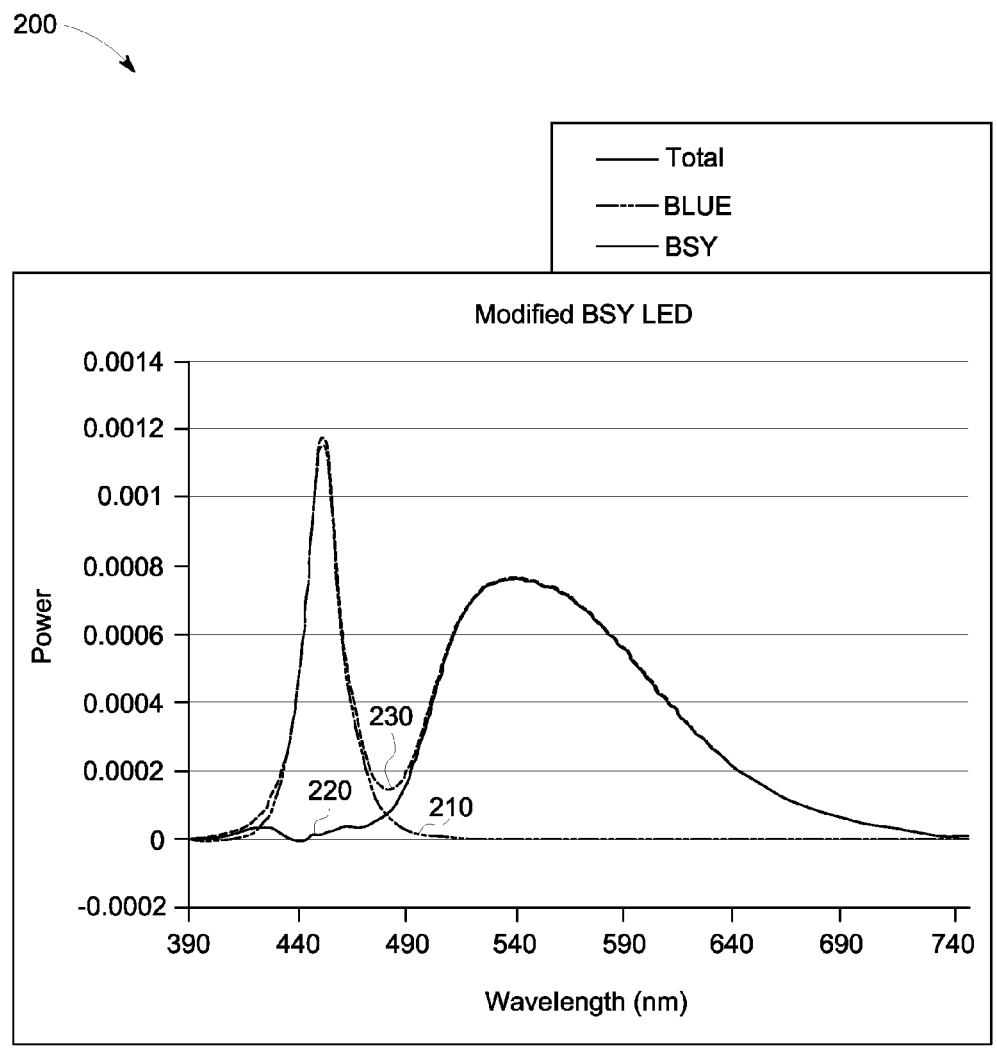
FIG. 2 depicts the spectrum of modified BSY LED 200 in accordance with some embodiments.

FIG. 2 depicts the spectrum of modified BSY LED 200 in accordance with some embodiments. The BSY only spectrum is shifted along the wavelength axis to the desired position. The efficacy of the new portion is determined based on the change in Stokes losses from the original position. The spectrum is determined for a blue LED being driven at a given current (curve 210—"BLUE LED").

A prescribed portion of the output power from the blue LED is converted to power in the BSY spectrum. The modified BSY spectrum 230 is adjusted in magnitude to the correct power based on the spectral power of the blue LED, the amount of power to be converted, and the conversion efficiency from the blue spectrum to the new BSY spectrum. The blue spectrum is adjusted to equal the amount of power that is not converted. The modified BSY spectrum is combined with the adjusted blue spectrum to give the output of the modified BSY LED 230.

Figure 3:
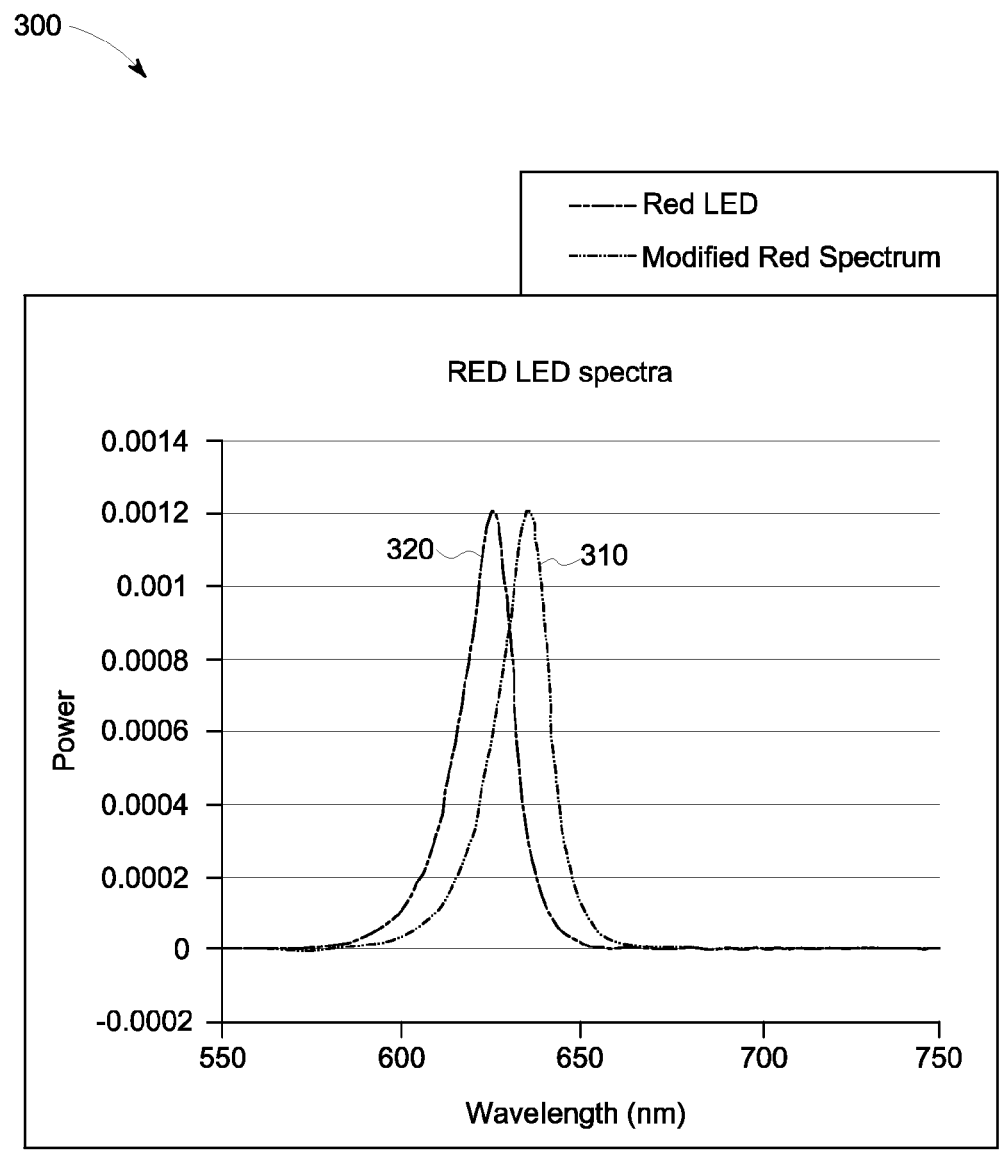
FIG. 3 depicts a modified red LED spectrum in accordance with some embodiments.

In accordance with some embodiments, the spectrum for a red LED powered at a given current can be determined. This spectrum can be modified by shifting the spectrum a prescribed amount along the wavelength axis. FIG. 3 depicts modified red LED spectrum 300 in accordance with some embodiments. The red LED spectrum 310 is shifted along the wavelength axis to result in a modified red spectrum 320.

Figure 4:
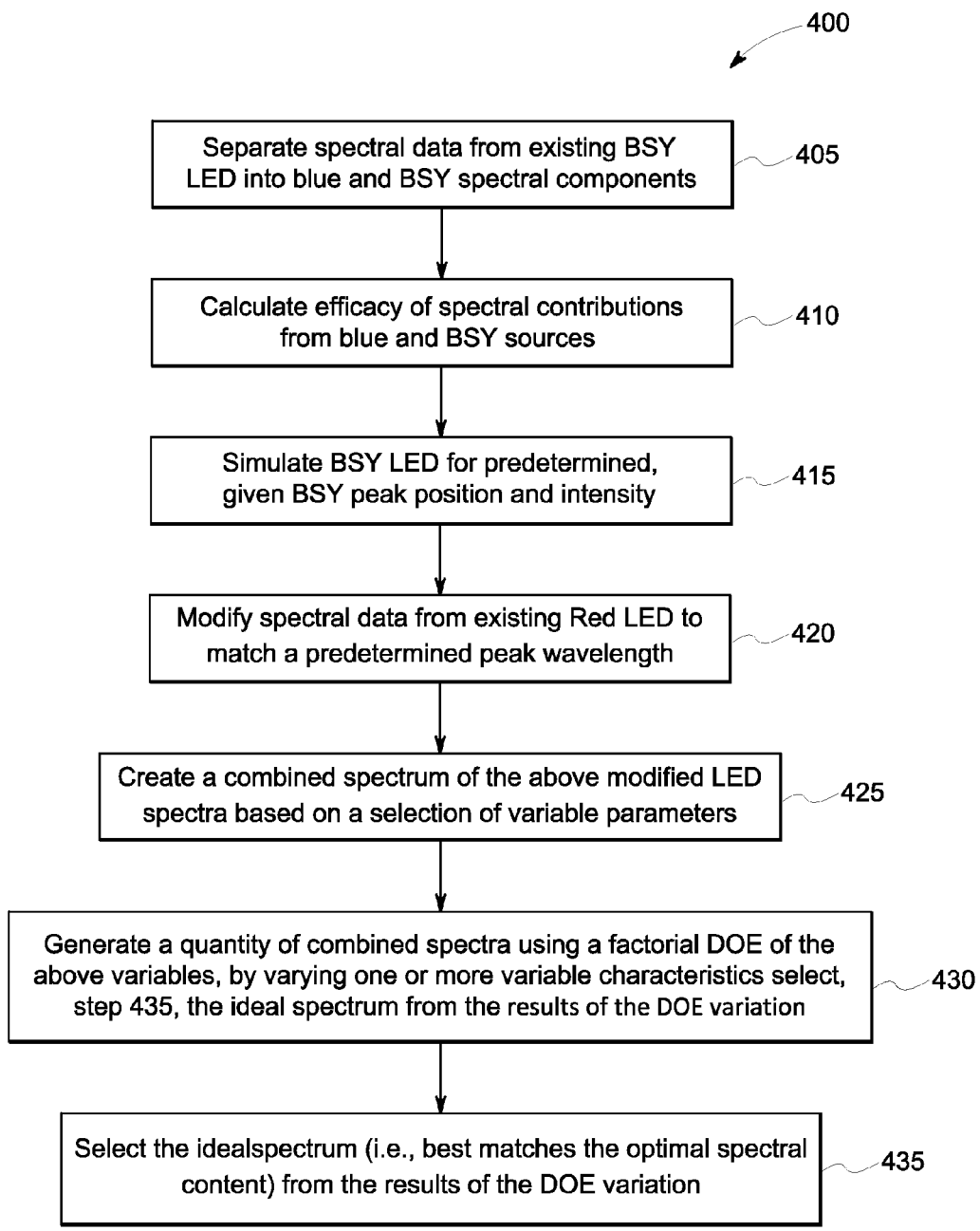
FIG. 4 depicts a process flow diagram in accordance with some embodiments.

FIG. 4 depicts process 400 for determining optimal spectral content of a BSY+Red LED light engine for any arbitrarily selected color rendering index (CRI) target in accordance with some embodiments. Spectral data from existing BSY LEDs is separated, step 405, into Blue band and BSY band spectral components. At step 410, the efficacies of the Blue and BSY spectral contributions are calculated. Simulate, step 415, a new BSY LED for a predetermined, given desired BSY peak position and intensity. Modify spectral data from existing Red LEDs, step 420, to match a predetermined, desired peak wavelength. Applying factorial DOE techniques, step 425, create a combined spectrum of the above modified LED spectra based on a selection of LED parameter variables. The LED parameter variables including BSY LED current, BSY LED quantity, BSY peak wavelength, amount of blue bleed-through, Red LED current, Red LED quantity, and Red LED wavelength. Generate a quantity of combined spectra, step 430, using a factorial DOE of the above variables, where one or more characteristics of the variables are varied. Select, step 435, the ideal spectrum from the results of the DOE variation, where the ideal spectrum best fits to the desired characteristics of the modified optimal spectral content.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for determining optimal spectral content of a BSY+Red LED light engine for any arbitrarily selected color rendering index (CRI) target, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A processor-implemented method of determining a modified spectral content of a light emitting diode (LED) light engine, wherein the LED light engine includes a blue-shifted yellow LED package in combination with a red LED, the method comprising:
   separating spectral data from the LED light engine into at least two spectral component bands;
   calculating respective efficacies for each of the at least two spectral components;
   simulating a first LED spectral component for a predetermined peak position and intensity, wherein the first LED spectral component includes spectral components of Blue band and BSY band spectral components;
   modifying spectral data from an existing Red LED to match a predetermined peak wavelength;
   applying factorial design-of-experiment techniques to the simulated first LED spectral component and the modified spectral data to obtain a selection of spectra; and
   selecting a spectrum from the selection of spectra, wherein the selected spectrum includes characteristics of the modified spectral content;
   producing a LED light engine/electronic driver combination having the selected spectrum to emit, when powered, light from the LED engine at the selected spectrum.

2. The method of claim 1, wherein the LED light engine includes a blue-shifted yellow (BSY) yttrium aluminum garnet (YAG) LED in combination with a red LED.

3. The method of claim 1, wherein the applying factorial design-of-experiment techniques includes varying LED parameter variables.

4. The method of claim 3, wherein the LED parameter variables include at least one of BSY LED current, BSY LED quantity, BSY peak wavelength, amount of blue bleed-through, Red LED current, Red LED quantity, and Red LED wavelength.

5. The method of claim 1, further including performing a non-linear optimization to maximize efficacy.

6. The method of claim 5, wherein during the non-linear optimization the applying factorial design-of-experiment techniques includes holding LED parameter variables to predetermined values.

* * * * *